US012294166B2

(12) United States Patent
Sakurai

(10) Patent No.: US 12,294,166 B2
(45) Date of Patent: May 6, 2025

(54) ANTENNA SUBSTRATE

(71) Applicant: KYOCERA Corporation, Kyoto (JP)

(72) Inventor: Keizou Sakurai, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 193 days.

(21) Appl. No.: 18/033,570

(22) PCT Filed: Oct. 22, 2021

(86) PCT No.: PCT/JP2021/039072

§ 371 (c)(1),
(2) Date: Apr. 25, 2023

(87) PCT Pub. No.: WO2022/091963

PCT Pub. Date: May 5, 2022

(65) Prior Publication Data

US 2023/0395978 A1 Dec. 7, 2023

(30) Foreign Application Priority Data

Oct. 29, 2020 (JP) ................................ 2020-181700
Feb. 22, 2021 (JP) ................................ 2021-026542

(51) Int. Cl.
*H01Q 9/04* (2006.01)
*H01Q 1/38* (2006.01)
*H01Q 13/08* (2006.01)

(52) U.S. Cl.
CPC ............... *H01Q 9/045* (2013.01); *H01Q 1/38* (2013.01); *H01Q 13/08* (2013.01)

(58) Field of Classification Search
CPC .......... H01Q 9/045; H01Q 1/38; H01Q 13/08; H01Q 1/48; H01Q 21/24; H05K 1/0218; H05K 1/115
See application file for complete search history.

(56) References Cited

U.S. PATENT DOCUMENTS 5,633,645 A * 5/1997 Day .................... H01Q 9/0457 343/700 MS
2010/0097274 A1* 4/2010 Rao ........................ H01Q 21/28 343/702
2020/0106192 A1* 4/2020 Avser ..................... H01Q 1/405

FOREIGN PATENT DOCUMENTS

JP 2012-182591 A 9/2012

* cited by examiner

*Primary Examiner* — David E Lotter
(74) *Attorney, Agent, or Firm* — Volpe Koenig

(57) ABSTRACT

An antenna substrate according to the present disclosure includes a first insulation layer including a first surface, a second surface located opposite the first surface, and a first through-hole conductor extending from the first surface to the second surface, a ground conductor located at the first surface, the ground conductor including a slot, a second insulation layer including a second through-hole conductor connected to the first through-hole conductor, the second insulation layer covering the ground conductor located at the first surface, and a first antenna conductor located at a surface located on the opposite side to the other surface of the second insulation layer, the other surface covering the ground conductor.

10 Claims, 4 Drawing Sheets

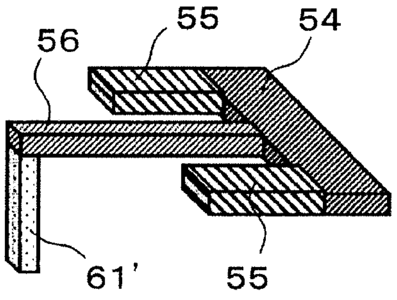
FIG. 6
FIG. 7A
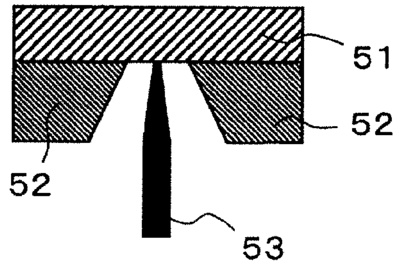
FIG. 7B
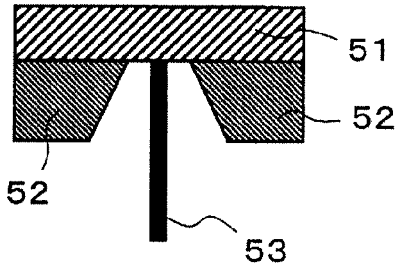
FIG. 7C
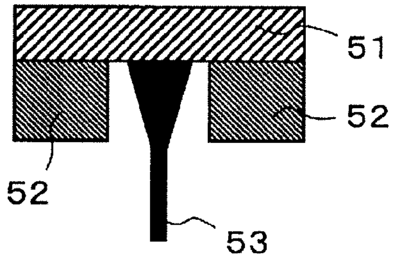

ANTENNA SUBSTRATE

TECHNICAL FIELD

The present invention relates to an antenna substrate.

BACKGROUND OF INVENTION

A communication device that uses a wireless network includes an antenna substrate as described in Patent Document 1, for example, for transmission and reception of electrical signals.

In a known antenna substrate, when an antenna has resonance points (points at which transmission characteristics are good) in a plurality of frequency bands, a filter structure or the like for removing radio waves having frequencies other than a desired frequency band is separately required. Thus, the known antenna substrate has a complicated structure, and is difficult to reduce in size.

CITATION LIST

Patent Literature

Patent Document 1: JP 2012-182591 A

SUMMARY

Solution to Problem

An antenna substrate according to the present disclosure includes a first insulation layer including a first surface, a second surface located opposite the first surface, and a first through-hole conductor extending from the first surface to the second surface, a ground conductor located at the first surface, the ground conductor including a slot, a second insulation layer including a second through-hole conductor connected to the first through-hole conductor, the second insulation layer covering the ground conductor located at the first surface, and a first antenna conductor located at a surface located on the opposite side to the other surface of the second insulation layer, the other surface covering the ground conductor. The slot has a cross shape in which a horizontal slot extending in an X axis direction in a plane direction and a vertical slot extending in a Y axis direction in a plane direction intersect with each other. The first antenna conductor includes a first pattern, two second patterns, and a third pattern. The first pattern has a rectangular shape including a first long side and a second long side in the X axis direction and short sides in the Y axis direction. The first long side includes a portion overlapping with the horizontal slot. The second long side does not overlap with the horizontal slot but overlaps the vertical slot. The two second patterns are individually located in contact with the second long sides with the vertical slot interposed between the two second patterns. The third pattern has a rectangular shape including short sides in the X axis direction and long sides in the Y axis direction. The third pattern is in contact with the second long side of the first pattern at a position within the vertical slot in plane perspective. The third pattern extends in a direction away from the first long side. The third pattern is connected to the second through-hole conductor. The horizontal slot is within the first pattern in plane perspective except for a portion protruding in the Y axis direction. The short sides of the first pattern are longer than the short sides of the third pattern.

BRIEF DESCRIPTION OF THE DRAWINGS

FIG. 6 is a perspective view of a second antenna conductor illustrated in FIG. 5.

FIGS. 7A to 7C are explanatory diagrams illustrating various variations of the first antenna conductor.

DESCRIPTION OF EMBODIMENTS

As described above, the known antenna substrate separately requires a filter structure or the like for removing radio waves having frequencies other than a desired frequency band. Because of this, the known antenna substrate has a complicated structure and reducing the size thereof is difficult. Thus, an antenna substrate that can improve transmission characteristics in a specific frequency band and that can be reduced in size is required.

The antenna substrate according to the present disclosure has the specific configuration as described above, which can improve transmission characteristics in a specific frequency band and reduce the size thereof.

Figure 1A:
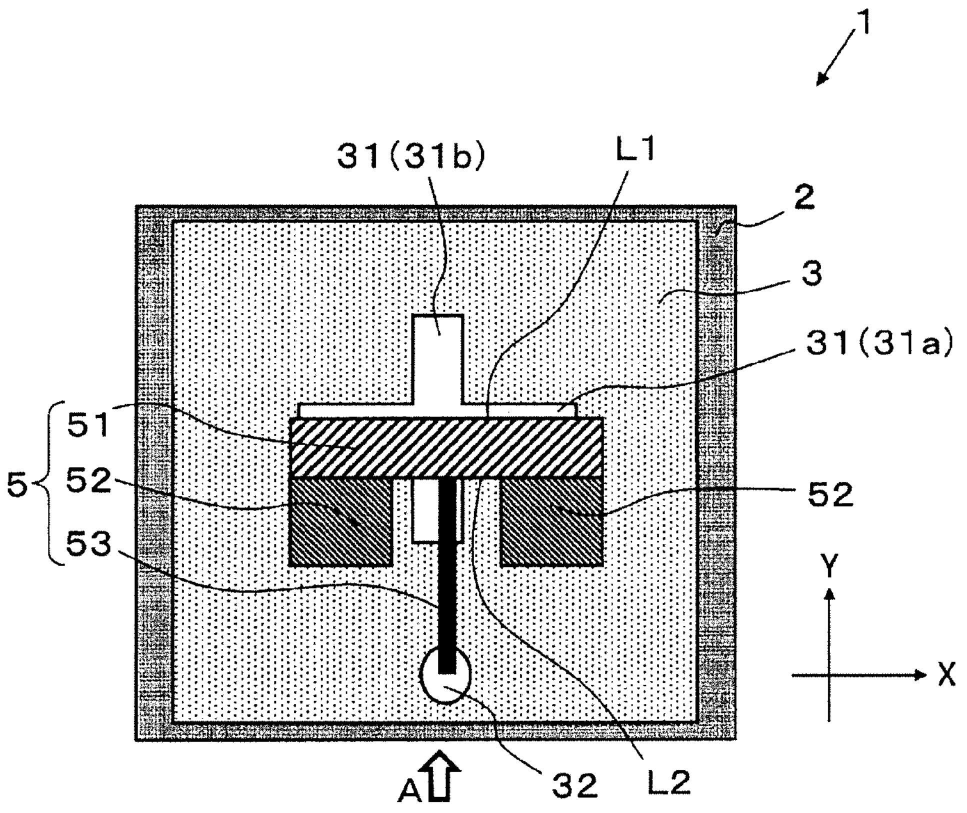
FIG. 1A is a top view illustrating an antenna substrate according to a first embodiment of the present disclosure (however, a second insulation layer is not illustrated)
Figure 1B:
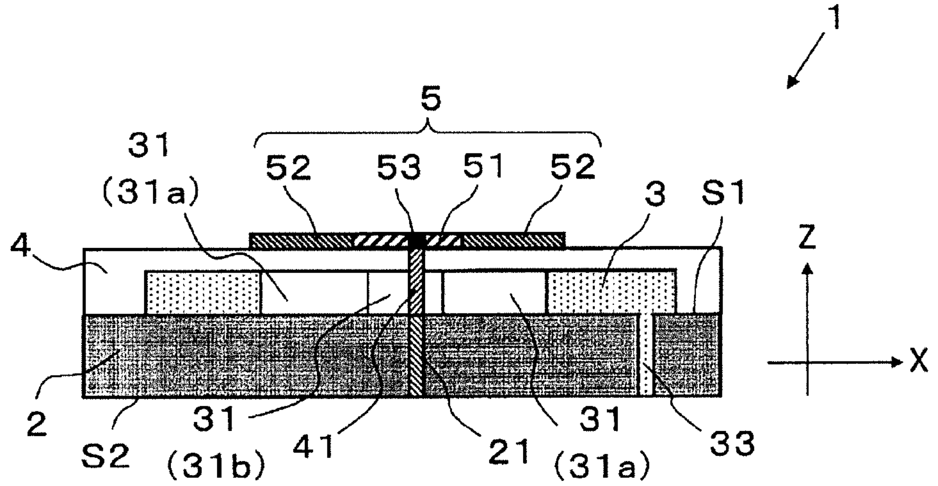
FIG. 1B is a perspective view of the antenna substrate according to the first embodiment of the present disclosure when the antenna substrate is viewed from a side surface on an arrow A side.

An antenna substrate according to a first embodiment of the present disclosure will be described with reference to FIGS. 1 to 3. FIG. 1A is a top view illustrating an antenna substrate 1 according to the first embodiment of the present disclosure (however, a second insulation layer 4 is not illustrated), and FIG. 1B is a perspective view of the antenna substrate 1 according to the first embodiment of the present disclosure when the antenna substrate 1 is viewed from a side surface on an arrow A side. As illustrated in FIGS. 1A and 1B, the antenna substrate 1 includes a first insulation layer 2, a ground conductor 3, a second insulation layer 4, and a first antenna conductor 5.

The first insulation layer 2 includes a first surface S1, a second surface S2, and a first through-hole conductor 21. The first insulation layer 2 is not particularly limited as long as the first insulation layer 2 is made of a material having an insulation property. Examples of the material having the insulation property include resins such as an epoxy resin, a bismaleimide-triazine resin, a polyimide resin, a polyphenylene ether resin, and Teflon (Registered Trademark) (a fluorine resin), and a ceramic. Two or more of these resins may be mixed and used.

The first insulation layer 2 may contain a reinforcing material. Examples of the reinforcing material include insulation fabric materials such as glass fiber, glass non-woven fabric, aramid non-woven fabric, aramid fiber, and polyester fiber. Two or more types of reinforcing materials may be used in combination. An inorganic insulation filler made of, for example, silica, barium sulfate, talc, clay, glass, calcium carbonate, or titanium oxide may be dispersed in the insulation layer.

The first insulation layer 2 includes a through hole that passes through from the first surface S1 up to the second surface S2. A first through-hole conductor 21 is located in the through hole. A material of the first through-hole conductor 21 is not particularly limited as long as the material has electrical conductivity. Examples of a material having electrical conductivity include metals such as copper. Specifically, the first through-hole conductor 21 is made by metal plating such as copper plating.

The ground conductor 3 including a slot 31 is located on the first surface S1 of the first insulation layer 2. A material of the ground conductor 3 is not particularly limited as long as the material has electrical conductivity. Examples of a material having electrical conductivity include metals such as copper. Specifically, the ground conductor 3 is made of a metal foil such as a copper foil or made by metal plating such as copper plating.

Figure 2:
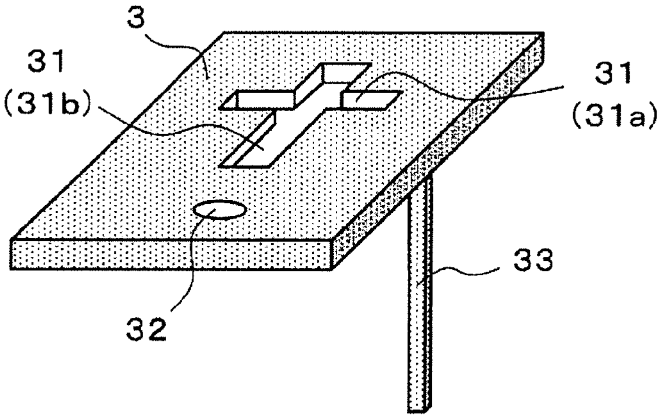
FIG. 2 is a perspective view of a ground conductor illustrated in FIG. 1.
Figure 3:
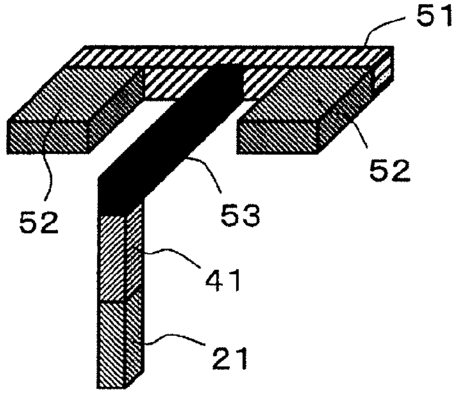
FIG. 3 is a perspective view of a first antenna conductor illustrated in FIG. 1.

As illustrated in FIG. 1B and FIG. 2, the ground conductor 3 includes a grounding-use through-hole conductor 33, and is located inside the through hole included in the first insulation layer 2. As illustrated in FIG. 1A and FIG. 2, a clearance 32 is formed in the ground conductor 3. The clearance 32 is located, for example, on an extended line of a long side of a vertical slot 31*b*.

As illustrated in FIG. 1A, when viewed from above, the slot 31 has a cross shape in which a horizontal slot 31*a* having a long axis in the X axis direction and the vertical slot 31*b* having a long axis in the Y axis direction intersect each other. The slot 31 is obtained by, for example, etching a solid conductor. The length (in a longitudinal direction) and width (in a lateral direction) of the slot 31 are not limited. Lengths in the longitudinal directions of the horizontal slot 31*a* and the vertical slot 31*b* are, for example, approximately equal to or longer than 0.4 mm and equal to or shorter than 5.4 mm. Lengths of the vertical slot 31*a* and the horizontal slot 31*b* in the lateral direction are, for example, approximately equal to or longer than 0.1 mm and equal to or shorter than 4.5 mm.

As illustrated in FIG. 1B, the second insulation layer 4 covers the first surface S1 of the first insulation layer 2. Similarly to the material of the first insulation layer 2, a material of the second insulation layer 4 is not particularly limited as long as the material has an insulation property. The second insulation layer 4 may contain a reinforcing material the same as or similar to the first insulation layer 2. The material having the insulation property and the reinforcing material are as described above, and detailed description thereof will be omitted. The material having the insulation property and the reinforcing material that form the second insulation layer 4 fill the slot 31 formed in the ground conductor 3.

Similarly to the first insulation layer 2, the second insulation layer 4 is also formed with a through hole penetrating from the upper surface up to the lower surface. The second through-hole conductor 41 is located in the through hole. The second through-hole conductor 41 is at a position facing the first through-hole conductor 21, and is electrically connected to the first through-hole conductor 21.

The first antenna conductor 5 is located on a surface of the second insulation layer 4 located on the opposite side to the other surface thereof being in contact with the ground conductor 3. The first antenna conductor 5 is provided to receive and transmit electromagnetic waves. The material of the first antenna conductor 5 is not particularly limited as long as the material is a material having electrical conductivity. Examples of a material having electrical conductivity include metals such as copper. Specifically, the first antenna conductor 5 is made of a metal foil such as a copper foil or formed by metal plating such as copper plating.

The first antenna conductor 5 includes a first pattern 51, two second patterns 52, and a third pattern 53. In the antenna substrate 1 according to the first embodiment, the arrangement of the first pattern 51, the two second patterns 52, and the third pattern 53 is important to improve transmission characteristics in a specific frequency band and to reduce the size of the antenna substrate 1.

As illustrated in FIG. 1A, the first pattern 51 has a rectangular shape having a first long side L1 and a second long side L2 in the X axis direction and short sides in the Y axis direction. In plane perspective, the first long side L1 includes a portion overlapping with the horizontal slot 31*a*, and the second long side L2 includes a portion not overlapping the horizontal slot 31*a* and partially overlapping with the vertical slot 31*b*. In other words, the first pattern 51 does not cross over the horizontal slot 31*a* in the Y axis direction. The configuration in which the first pattern 51 does not cross over the horizontal slot 31*a* has an advantage that dispersion of resonant regions generated in the first pattern 51 can be reduced. The short sides of the first pattern 51 are longer than the short sides of the third pattern 53. The length of the long side and the length of the short side of the first pattern 51 are not limited. The lengths of the first long side L1 and the second long side L2 of the first pattern 51 are, for example, approximately equal to or longer than 0.5 mm and equal to or shorter than 6 mm. The length of the short side of the first pattern 51 is, for example, approximately equal to or longer than 0.1 mm and equal to or shorter than 5.5 mm.

As illustrated in FIG. 1A, the second patterns 52 are located in contact with the second long side L2 with the vertical slot 31*b* interposed between the second patterns 52. In the second pattern 52, the length of the portion in contact with the second long side L2 is not limited and is, for example, approximately equal to or longer than 0.1 mm and equal to or shorter than 3 mm. The second pattern 52 protrudes from a portion in contact with the second long side L2 in a direction away from the first long side L1, by a distance, for example, approximately equal to or longer than mm and equal to or shorter than 3 mm.

As illustrated in FIG. 1A, the third pattern 53 includes short sides in the X axis direction and long sides in the Y axis direction. The third pattern 53 is in contact with the second long side L2 of the first pattern 51 at a position within the vertical slot 31*b* in plane perspective between the second patterns 52. The long sides of the third pattern 53 are, for example, approximately equal to or longer than 0.5 mm and equal to or shorter than 7 mm. The short sides of the third pattern 53 are, for example, approximately equal to or longer than 0.03 mm and equal to or shorter than 4 mm.

As illustrated in FIG. 1A, the third pattern 53 extends up to the clearance 32 formed in the ground conductor 3 in plane perspective. As illustrated in FIG. 1B and FIG. 3, the third pattern 53 is electrically connected to the second through-hole conductor 41.

As illustrated in FIG. 1A, the long side of the horizontal slot 31*a* is shorter than the long sides of the first pattern 51, and is at a position within both end portions of the first pattern 51 in plane perspective. That is, the horizontal slot 31*a* is within the first pattern 51 in plane perspective except for a portion protruding in the Y axis direction.

Figure 4:
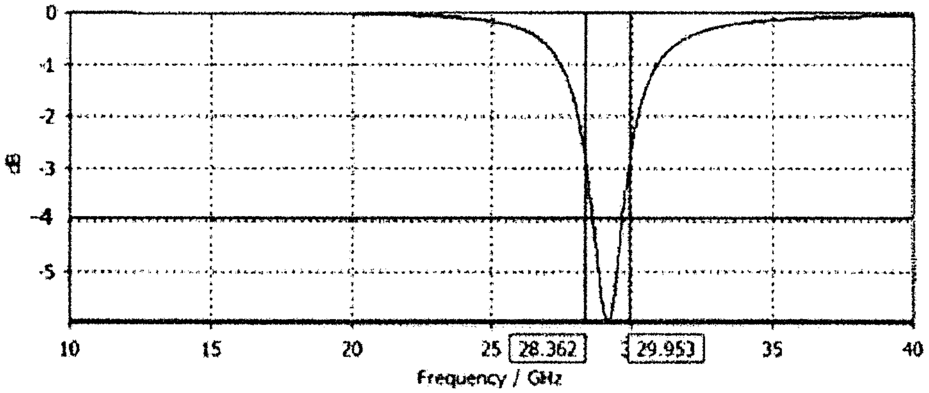
FIG. 4 is a simulation model of the antenna substrate according to the first embodiment of the present disclosure.

FIG. 4 illustrates a simulation model of the antenna substrate 1 according to the first embodiment. The antenna substrate 1 includes the first antenna conductor 5 in which the first pattern 51, the two second patterns 52, and the third pattern 53 are arranged as described above. In the simulation model, the horizontal axis represents a frequency and the vertical axis represents a return loss. The simulation model illustrated in FIG. 4 indicates that a resonance point (a point at which the return loss decreases) appears in one frequency band.

That is, when radio waves having different frequencies are mixed, the antenna substrate 1 according to the first embodiment can transmit and receive only radio waves in one frequency band without providing a filter, for example. In the first antenna conductor 5, the third pattern 53 is located at a space formed by the first pattern 51 and the two second patterns 52 (a cove-like portion). Thus, the entire length (in the Y axis direction) of the first antenna conductor 5 can be shortened. As described above, the fact that the antenna substrate 1 according to the first embodiment is capable of improving transmission characteristics in a specific frequency band and is capable of being reduced in size can be understood.

In the first antenna conductor 5, adjusting the lengths of the long sides or the lengths of the short sides of the first pattern 51, the two second patterns 52, and the third pattern 53 enables the center frequency of the resonance point to be adjusted. Adjusting the length of the short side of the first pattern 51 (the length in the Y axis direction) enables the bandwidth of the resonance point to be widened or narrowed.

The manufacturing method of the antenna substrate 1 according to the first embodiment is not limited. The antenna substrate 1 may be manufactured, for example, by the follow procedure. First, a through hole is formed in an insulation layer serving as the first insulation layer 2. The through hole is formed, for example, by drilling, laser machining, or blasting process. After the through hole is formed, the ground conductor 3 is formed on the first surface S1 of the insulation layer serving as the first insulation layer 2, and the first through-hole conductor 21 and the grounding-use through-hole conductor 33 are formed in the through hole. These conductors are formed by, for example, copper plating by a semi-additive method.

An insulation layer serving as the second insulation layer 4 is formed. The insulation layer covers the first surface S1 of the first insulation layer 2. At this time, the slot 31 formed in the ground conductor 3 is filled with the insulation layer (the material having the insulation property and the reinforcing material described above) serving as the second insulation layer 4. A through hole is formed in the insulation layer serving as the second insulation layer 4 at a position facing the first through-hole conductor 21.

The first antenna conductor 5 is formed on the surface of the second insulation layer 4, and the second through-hole conductor 41 is formed inside the through hole. These conductors are also formed by copper plating by, for example, a semi-additive method. As for the first antenna conductor 5, the first pattern 51, the two second patterns 52, and the third pattern 53 are formed in the arrangement described above. The antenna substrate 1 according to the first embodiment can be obtained in this manner.

Figure 5A:
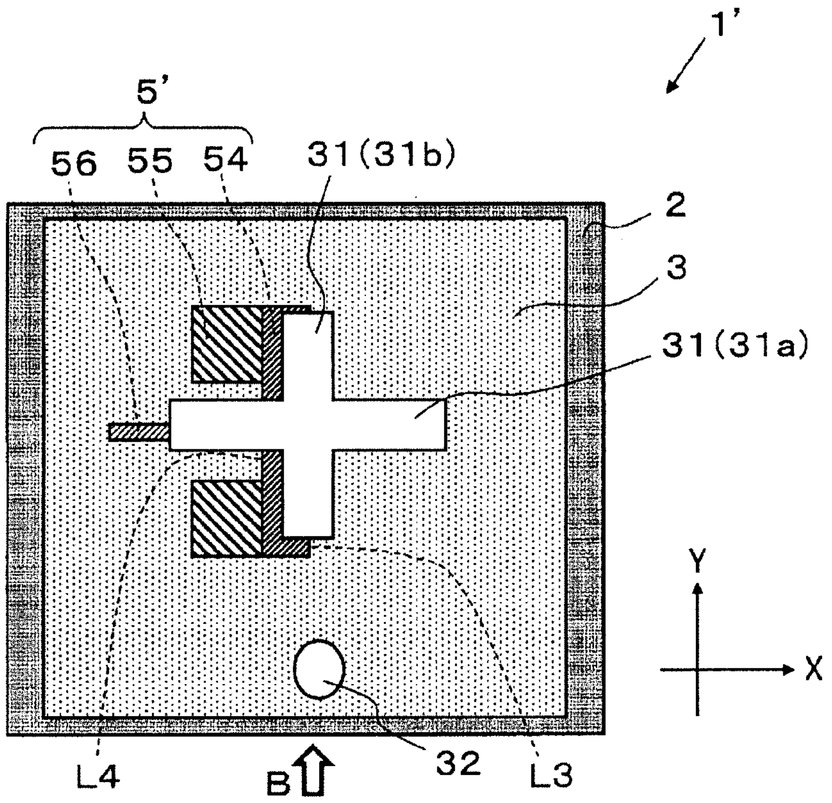
FIG. 5A is a top view illustrating an antenna substrate according to a second embodiment of the present disclosure (however, a first antenna conductor and a second insulation layer are not illustrated)
Figure 5B:
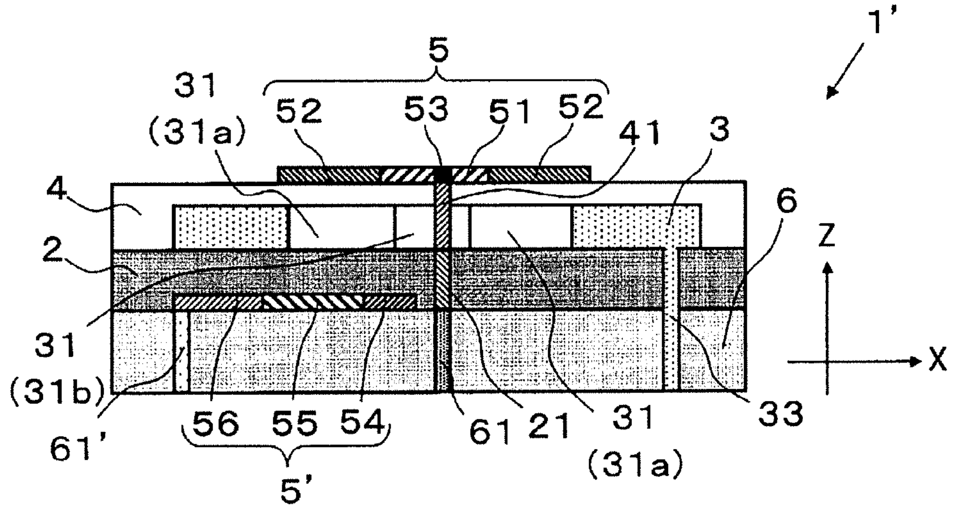
FIG. 5B is a perspective view of the antenna substrate according to the second embodiment of the present disclosure when the antenna substrate is viewed from a side surface on an arrow B side.

The antenna substrate according to the present disclosure is not limited to the antenna substrate 1 according to the first embodiment described above. For example, as in an antenna substrate 1' according to a second embodiment illustrated in FIG. 5, a second antenna conductor 5' may be included in addition to the first antenna conductor 5. FIG. 5A is a top view illustrating an antenna substrate according to the second embodiment of the present disclosure (however, the first antenna conductor and the second insulation layer are not illustrated). FIG. 5B is a perspective view illustrating the antenna substrate according to the second embodiment of the present disclosure from a side surface on an arrow B side. In FIG. 5A and FIG. 5B, the same reference signs denote the same members as those illustrated in FIG. 1A and FIG. 1B, and detailed description thereof will be omitted.

As illustrated in FIGS. 5A and 5B, the second antenna conductor 5' exists on an insulation layer different from that of the first antenna conductor 5 in a positional relationship obtained by rotating the first antenna conductor 5 by approximately 90°. Specifically, the first antenna conductor 5 and the second antenna conductor 5' are respectively located above and below the ground conductor 3. In order to clearly illustrate the second antenna conductor 5', the first antenna conductor 5 is omitted in FIG. 5A. As illustrated in FIG. 5B, a third insulation layer 6 including a third through-hole conductor 61 and a fourth through-hole conductor 61' is further located on the second surface S2 of the first insulation layer 2. The first through-hole conductor 21 and the third through-hole conductor 61 are connected to each other. The second antenna conductor 5' including a fourth pattern 54, two fifth patterns 55, and a sixth pattern 56 is located on a surface of the third insulation layer 6 on the first insulation layer 2 side.

Similarly to the first insulation layer 2 and the second insulation layer 4, a material of the third insulation layer 6 is not particularly limited as long as the material has an insulation property. The third insulation layer 6 may contain a reinforcing material the same as or similar to the first insulation layer 2 and the second insulation layer 4. The material having the insulation property and the reinforcing material are as described above, and detailed description thereof will be omitted.

The fourth pattern 54 of the second antenna conductor 5' is a member corresponding to the first pattern 51 of the first antenna conductor 5. The two fifth patterns 55 of the second antenna conductor 5' are members corresponding to the two second patterns 52 of the first antenna conductor 5. The sixth pattern 56 of the second antenna conductor 5' is a member corresponding to the third pattern 53 of the first antenna conductor 5.

As illustrated in FIG. 5A, the fourth pattern 54 has a rectangular shape including a third long side L3 and a fourth long side L4 in the Y axis direction and short sides in the X axis direction. The third long side L3 includes a portion overlapping with the vertical slot 31*b*, and the fourth long side L4 includes a portion not overlapping with the vertical slot 31*b* and partially overlapping the horizontal slot 31*a*, in plane perspective. The short sides of the fourth pattern 54 are longer than short sides of the sixth pattern 56. The lengths of the third long side L3 and the fourth long side L4 of the fourth pattern 54 and the length of the short side thereof are not limited. The length of the third long side L3 and the length of the fourth long side L4 of the fourth pattern 54 are, for example, approximately equal to or longer than 0.2 mm and equal to or shorter than 6 mm. The length of the short side of the fourth pattern 54 is, for example, approximately equal to or longer than 0.1 mm and equal to or shorter than 5.5 mm.

As illustrated in FIG. 5A, the two fifth patterns 55 are located in contact with the fourth long side L4 of the fourth pattern 54 with the horizontal slot 31*a* interposed therebetween in plane perspective. In the two fifth patterns 55, the length of the portion being in contact with the fourth long side L4 of the fourth pattern 54 is not limited, and is, for example, approximately equal to or longer than 0.1 mm and equal to or shorter than 3 mm. The fifth pattern 55 protrudes from a portion being in contact with the long side of the fourth pattern 54 in a direction away from the third long side L3, for example, by a distance approximately equal to or longer than 0.05 mm and equal to or shorter than 3 mm.

As illustrated in FIG. 5A, the sixth pattern 56 has a rectangular shape including long sides in the X axis direction and short sides in the Y axis direction, and is located in contact with the fourth long side L4 of the fourth pattern 54 at a position within the horizontal slot 31*a* in plane perspective. The long side of the sixth pattern 56 is, for example, approximately equal to or longer than 0.5 mm and equal to or shorter than 10 mm. The short side of the sixth pattern 56 is, for example, approximately equal to or longer than 0.01 mm and equal to or shorter than 4 mm. As illustrated in FIG. 5B and FIG. 6, the sixth pattern 56 is connected to the fourth through-hole conductor 61'.

As illustrated in FIG. 5A, the long side of the vertical slot 31*b* is shorter than the long side of the fourth pattern 54, and exists at a position within both end portions of the fourth pattern 54 in plane perspective. That is, the vertical slot 31*b* is within the fourth pattern 54 in plane perspective except for a portion protruding in the X axis direction.

When the second antenna conductor 5' is further included as in the antenna substrate 1' according to the second embodiment, not only transmission and reception of a radio wave only in one direction but also expansion of the directivity of a radio wave can be achieved. A circularly polarized wave (transmission of a radio wave in a spiral manner) can improve a transmission property in a place where there are many obstacles.

The present disclosure is not limited to the above-described examples of the embodiments, and various variations can be made without departing from the gist of the present disclosure. For example, the lengths of the two second patterns 52 and the length of the third pattern 53 in the Y axis direction are different from each other in the above-described examples of the embodiments. However, the lengths may be the same. This may reduce the length of the first antenna conductor 5 in the Y axis direction, and thus, the reduction may be advantageous for reducing the size of the antenna substrate, in some cases. Similarly, when the lengths of the two fifth patterns 55 and the length of the sixth pattern 56 are the same, the length of the second antenna conductor 5' in the X axis direction may be reduced, which may be advantageous for reducing the size of the antenna substrate in some cases. When both of the first antenna conductor 5 and the second antenna conductor 5' have such a configuration, the configuration is more advantageous for size reduction.

In the above-described examples of the embodiments, when the first antenna conductor 5 is viewed in a plan view, the interval between the second pattern 52 and the third pattern 53 is constant. However, the interval between the second pattern 52 and the third pattern 53 does not need to be constant. FIGS. 7A to 7C illustrate various variations of the first antenna conductor.

As illustrated in FIGS. 7A to 7C, the first antenna conductor 5 may have a structure in which the interval between the second pattern 52 and the third pattern 53 becomes narrower with decreasing distance to the first pattern 51 in a plan view. The structure is not limited as long as the interval between the second pattern 52 and the third pattern 53 becomes narrower with decreasing distance to the first pattern 51.

As illustrated in FIG. 7A, the shapes of both the second pattern 52 and the third pattern 53 may be deformed such that the interval between the second pattern 52 and the third pattern 53 becomes narrower with decreasing distance to the first pattern 51. Alternatively, as illustrated in FIGS. 7B and 7C, the shape of one of the second pattern 52 and the third pattern 53 may be deformed such that the interval between the second pattern 52 and the third pattern 53 becomes narrower with decreasing distance to the first pattern 51.

As described above, making the interval between the second pattern 52 and the third pattern 53 narrower with decreasing distance to the first pattern 51 can reduce the reflection of a current flowing through the third pattern 53, which is advantageous for improving the electrical characteristics.

FIGS. 7A to 7C are diagrams illustrating variations of the first antenna conductor 5, and the same or similar applies to the second antenna conductor 5'. That is, as illustrated in FIGS. 7A to 7C, the second antenna conductor 5' may also have a structure in which the interval between the fifth pattern 55 and the sixth pattern 56 becomes narrower with decreasing distance to the fourth pattern 54 in a plan view.

Although the corner portions of the first antenna conductor 5 and the second antenna conductor 5' are right-angled in the above-described examples of the embodiments, at least some of the corner portions may have a curved shape. Forming the corner portion of the antenna conductor into a curved shape as described above can reduce reflection of a current flowing in the vicinity of the outer periphery of the antenna conductor, which is advantageous for improving electrical characteristics.

The wavelength of a radio wave becomes smaller in an insulation layer having a dielectric constant larger than a dielectric constant of air. Thus, as in the second embodiment described above, the second antenna conductor 5' that transmits and receives radio waves in the insulation layer may be smaller than the first antenna conductor 5 that transmits and receives radio waves in the air. In other words, in the X axis direction and the Y axis direction, the length of the second antenna conductor 5' may be smaller than the length of the first antenna conductor 5 in some cases. As a result, the area occupied by the second antenna conductors 5' in the third insulation layer 6 can be reduced, and the length of the vertical slot 31*b* overlapping the second antenna conductors can be shortened, which are advantageous for reducing the size of the antenna substrate.

REFERENCE SIGNS

1, 1' Antenna substrate
2 First insulation layer
21 First through-hole conductor
3 Ground conductor
31 Slot
31*a* Horizontal slot
31*b* Vertical slot
32 Clearance
33 Grounding-use through-hole conductor
4 Second insulation layer
41 Second through-hole conductor
5 First antenna conductor
51 First pattern
52 Second pattern
53 Third pattern

5' Second antenna conductor
54 Fourth pattern
55 Fifth pattern
56 Sixth pattern
6 Third insulation layer
61 Third through-hole conductor
61' Fourth through-hole conductor
L1 First long side
L2 Second long side
L3 Third long side
L4 Fourth long side
S1 First surface
S2 Second surface

The invention claimed is:

1. An antenna substrate comprising:

a first insulation layer comprising a first surface, a second surface located opposite the first surface, and a first through-hole conductor extending from the first surface to the second surface;

a ground conductor located at the first surface, the ground conductor comprising a slot;

a second insulation layer comprising a second through-hole conductor connected to the first through-hole conductor, the second insulation layer covering the ground conductor located at the first surface; and a first antenna conductor located at a surface located on the opposite side to the other surface of the second insulation layer, the other surface covering the ground conductor, wherein the slot has a cross shape in which a horizontal slot extending in an X axis direction in a plane direction and a vertical slot extending in a Y axis direction in a plane direction intersect with each other, the first antenna conductor comprises a first pattern, two second patterns, and a third pattern, the first pattern has a rectangular shape comprising a first long side and a second long side in the X axis direction and short sides in the Y axis direction, the first long side comprising a portion overlapping with the horizontal slot, the second long side not overlapping with the horizontal slot but overlapping the vertical slot, the two second patterns are individually located in contact with the second long side with the vertical slot interposed between the two second patterns, the third pattern has a rectangular shape comprising short sides in the X axis direction and long sides in the Y axis direction, the third pattern being in contact with the second long side of the first pattern at a position within the vertical slot in plane perspective, the third pattern extending in a direction away from the first long side, and the third pattern being connected to the second through-hole conductor, the horizontal slot is within the first pattern in plane perspective except for a portion protruding in the Y axis direction, and the short sides of the first pattern are longer than the short sides of the third pattern.

2. The antenna substrate according to claim 1, wherein a third insulation layer comprising a third through-hole conductor and a fourth through-hole conductor is further located at the second surface of the first insulation layer, and the first through-hole conductor and the third through-hole conductor are connected to each other, a second antenna conductor comprising a fourth pattern, two fifth patterns, and a sixth pattern is located at a surface of the third insulation layer on the first insulation layer side, the fourth pattern has a rectangular shape comprising a third long side and a fourth long side in the Y axis direction and short sides in the X axis direction, the third long side comprises a portion overlapping the vertical slot, and the fourth long side does not overlap with the vertical slot but overlaps with the horizontal slot, the two fifth patterns are individually located in contact with the fourth long side with the horizontal slot interposed between the two fifth patterns, the sixth pattern has a rectangular shape comprising long sides in the X axis direction and short sides in the Y axis direction, the sixth pattern is in contact with the fourth long side of the fourth pattern at a position within the horizontal slot in plane perspective, the sixth pattern extends in a direction away from the third long side, and the sixth pattern is connected to the fourth through-hole conductor, the vertical slot is within the fourth pattern in plane perspective except for a portion protruding in the X axis direction, and the short sides of the fourth pattern are longer than the short sides of the sixth pattern.

3. The antenna substrate according to claim 1, wherein a length of the second pattern in the Y axis direction is the same as a length of the third pattern in the Y axis direction.

4. The antenna substrate according to claim 2, wherein a length of the fifth pattern in the X axis direction is the same as a length of the sixth pattern in the X axis direction.

5. The antenna substrate according to claim 2, wherein a length of the second pattern in the Y axis direction is the same as a length of the third pattern in the Y axis direction, and a length of the fifth pattern in the X axis direction is the same as a length of the sixth pattern in the X axis direction.

6. The antenna substrate according to claim 1, wherein the first antenna conductor has a structure in which an interval between the second pattern and the third pattern becomes narrower with decreasing distance to the first pattern.

7. The antenna substrate according to claim 2, wherein the second antenna conductor has a structure in which an interval between the fifth pattern and the sixth pattern becomes narrower with decreasing distance to the fourth pattern.

8. The antenna substrate according to claim 1, wherein at least some of corner portions of the first antenna conductor have a curved shape.

9. The antenna substrate according to claim 2, wherein at least some of corner portions of the second antenna conductor have a curved shape.

10. The antenna substrate according to claim 2, wherein a length of the second antenna conductor in each of the X axis direction and the Y axis direction is smaller than a length of the first antenna conductor in a respective one of the X axis direction and the Y axis direction.

* * * * *